United States Patent
Farrell et al.

[11] 3,709,132
[45] Jan. 9, 1973

[54] PHOTOGRAPHIC FOCUS ADJUSTMENT APPARATUS

[75] Inventors: George J. Farrell, Bedford; Walter R. Lyon, West Roxbury, both of Mass.; Loring K. Mills, Hampton, N.H.; Reginald O. Shaw, Westhampton, Mass.

[73] Assignee: Polaroid Corporation, Cambridge, Mass.

[22] Filed: Nov. 27, 1970

[21] Appl. No.: 93,340

[52] U.S. Cl..............................95/45, 95/34, 95/44 R
[51] Int. Cl.................................................G03b 3/02
[58] Field of Search...............95/39, 45, 44; 285/226

[56] References Cited

UNITED STATES PATENTS

| | | | |
|---|---|---|---|
| 3,036,148 | 5/1962 | Swerdlow | 285/226 X |
| 2,357,327 | 9/1944 | Harris et al. | 95/45 |
| 2,270,311 | 1/1942 | Kende et al. | 95/45 |
| 3,447,439 | 6/1969 | Rice | 95/39 |
| 2,238,498 | 4/1941 | Mihalyi | 95/45 |
| 2,972,291 | 2/1961 | Kindig | 95/45 |
| 3,251,285 | 5/1966 | Uterhart | 95/45 |

Primary Examiner—Samuel S. Matthews
Assistant Examiner—E. M. Bero
Attorney—Brown & Mikulka

[57] ABSTRACT

Photographic focus adjustment apparatus for varying the axial position of a camera objective lens or lens element is disclosed in each embodiment as comprising lens carriage means having external threads, lens carriage support means having internal threads mating with the threads on the lens carriage means, sliding key means for preventing rotation of the carriage means with the carriage support means while providing freedom of axial movement of the carriage means, and manually operable actuating means for effecting selective rotation of the carriage support means to cause the carriage means and thus the lens (or lens element) to move along its axis. In one embodiment depicted the carriage support means, as well as the carriage means, moves axially upon rotation thereof in such a way as to obviate exposure of any threads to atmospheric dust and other foreign matter. In another embodiment disclosed, contamination of the threads is avoided by the provision of an expansible bellows between the lens carriage means and the camera housing.

3 Claims, 12 Drawing Figures

PATENTED JAN 9 1973

INVENTORS
GEORGE J. FARRELL
WALTER R. LYON
LORING K. MILLS
and
REGINALD O. SHAW

BY Brown and Mikulka
and
John H. Coult
ATTORNEYS

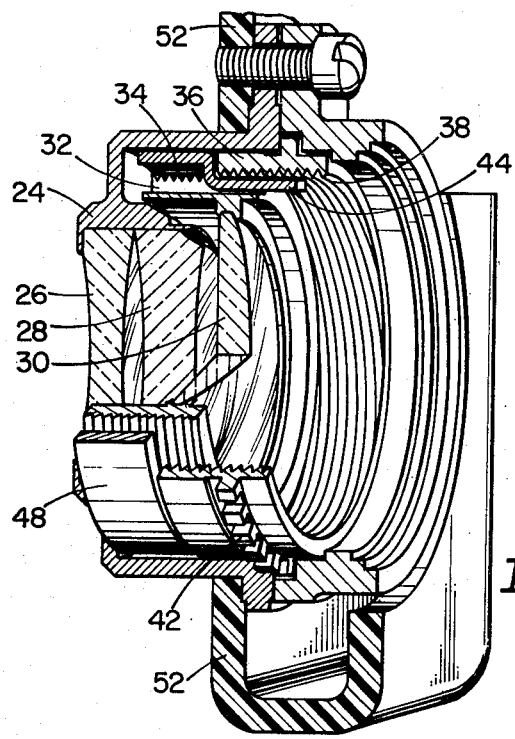
Fig. 3.
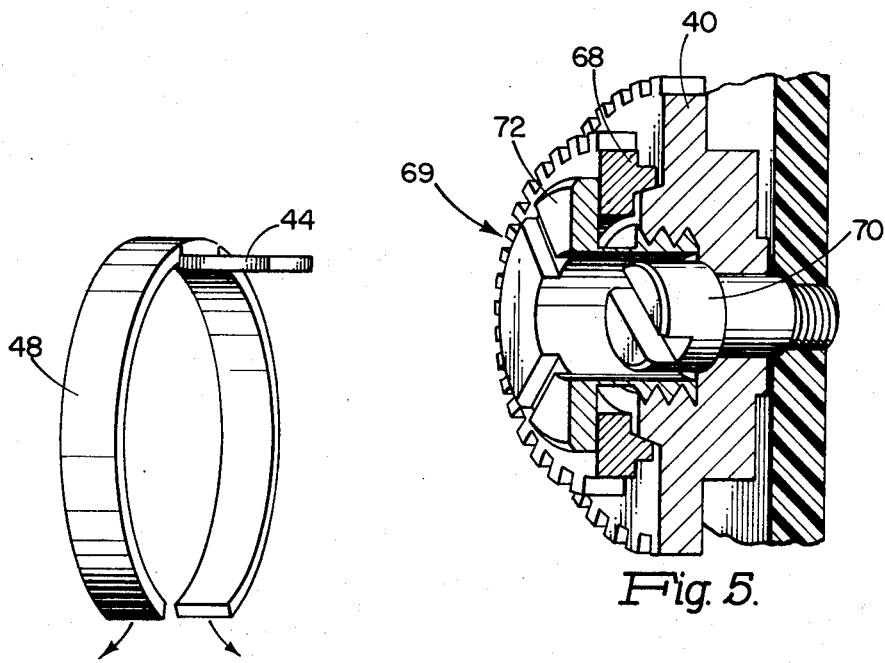
Fig. 4.
Fig. 5.

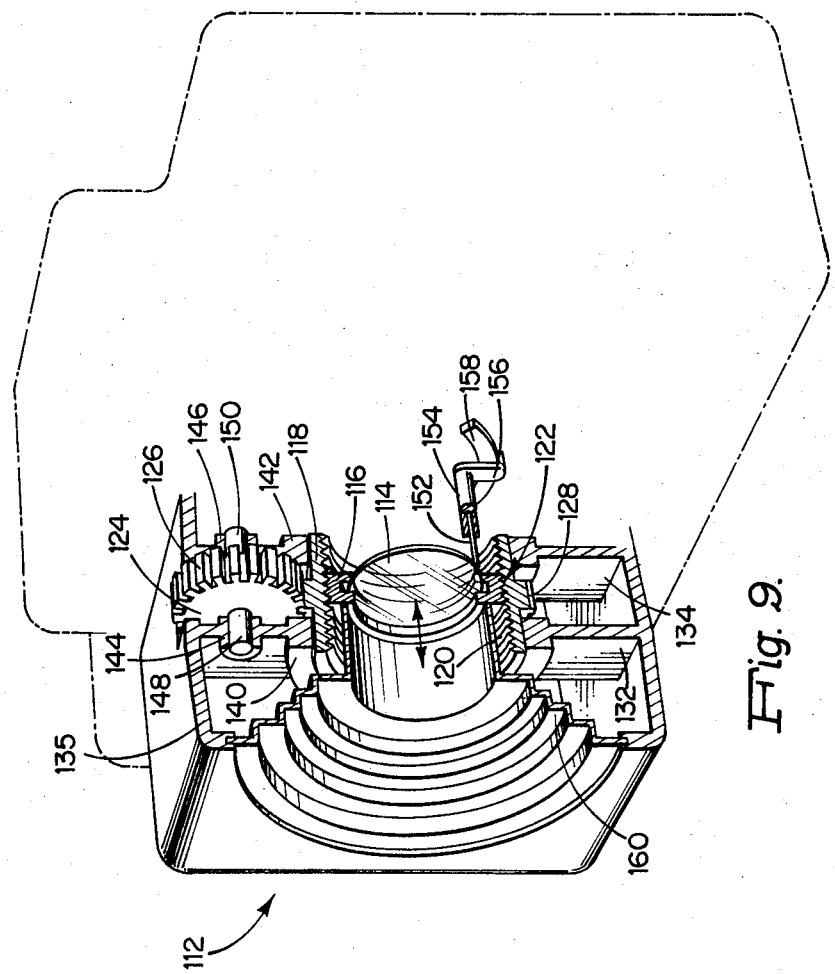
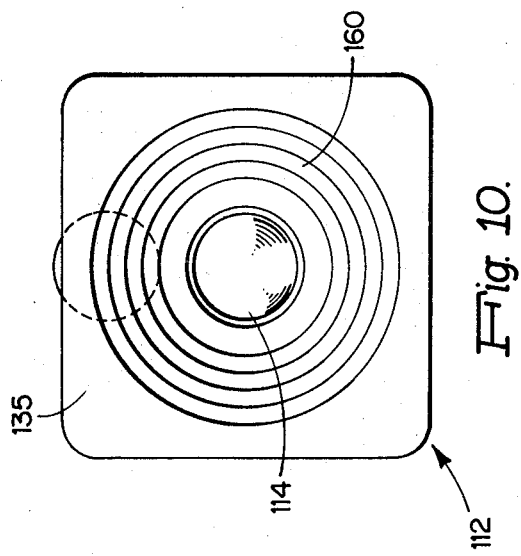

PHOTOGRAPHIC FOCUS ADJUSTMENT APPARATUS

BACKGROUND OF THE INVENTION

This invention is directed to the provision of focus adjustment apparatus which is particularly suited for incorporation in cameras constructed to fold very compactly face-down into a self-contained housing. Conventional focus adjustment apparatus, such as the type comprising a lens barrel which moves axially when rotated, would be unacceptable if embodied in a camera of the construction described for the reason that the lens barrel (or other corresponding axially displaced element) would have to be adjusted to a non-interfering position before the camera could be collapsed.

OBJECTS OF THE INVENTION

It is an object of this invention to provide focus adjustment apparatus adapted for use in folding cameras of the nature described in which axial movement of a position-adjustable objective or element thereof is confined to a locus of travel completely within the camera housing, thus precluding interference with the erection or take-down of the camera irrespective of the focus setting of the objective.

It is another object to provide photographic focus adjustment apparatus having the capabilities described, and which is sealed against contamination by outside dirt and other foreign matter.

It is a further object to provide photographic focus adjustment apparatus which is highly precise and which may be calibrated quickly and easily.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 3 is an enlarged fragmentary perspective view, partly broken away, of the focus adjustment apparatus shown in FIGS. 1-2;

FIG. 4 is a perspective view of a key comprising part of the FIGS. 1-3 apparatus;

FIG. 5 is an enlarged fragmentary view, partly broken away, of a compound idler gear comprising part of the FIGS. 1-4 apparatus; elements of the gear are lockable in a selected relative angular attitude to enable the apparatus to be calibrated;

FIG. 7A shows the element as it might appear when adjusted to its rear-most (infinity) setting; FIG. 7B shows the element as it might appear adjusted to assume its forward-most (near limit) setting;

FIG. 9 is a fragmentary perspective view, partly broken away, of a third embodiment of the invention; and FIG. 10 is a front elevational view of the FIG. 9 embodiment.

DESCRIPTION OF THE PREFERRED EMBODIMENTS

The drawings illustrate three of the many possible implementations of the principles of the invention. For reasons which will become apparent as this description proceeds, each embodiment provides the capability of adjusting a lens, which may be the lens in a one-element objective or a movable element of a compound objective. As made clear in the above-stated objects of the invention, in each embodiment adjustment of the lens is effected without the extension of any structure from the housing for the assembly.

Figure 1:
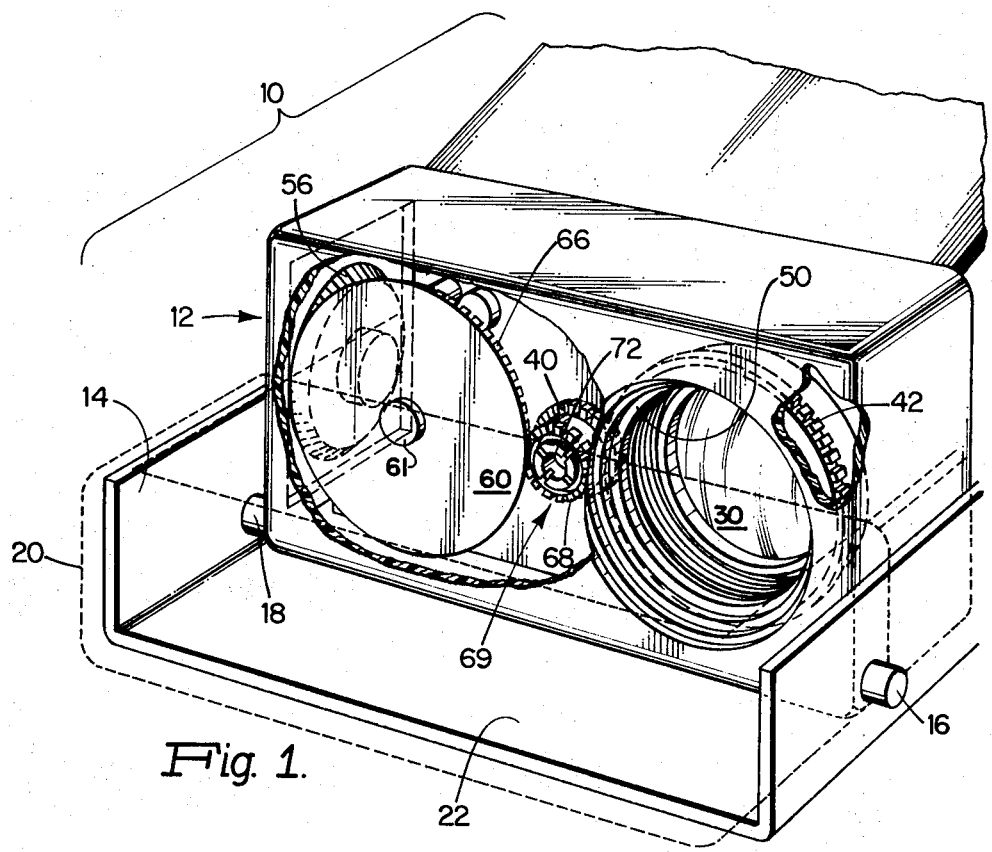
FIG. 1 is a fragmentary perspective view of a front assembly of a photographic camera which embodies the principles of this invention; a housing for the assembly is partially broken away to show internal components which would otherwise be hidden.

Focus adjustment apparatus according to this invention is particularly useful in a folding camera which erects from and collapses into a self-contained housing. The first of the illustrated embodiments is shown in FIGS. 1-5. FIG 1 illustrates quite clearly the need for a focus adjustment mechanism having the characteristic and capabilities described. This figure shows a portion of a photographic camera 10 having a front assembly 12 pivotally mounted on a housing 14 by pins 16, 18. The camera is shown in its erected position with its front assembly 12 in an operative attitude. The broken line outline of the front assembly 12 illustrates the assembly 12 as it would appear when the camera is collapsed for storage.

The bottom wall 22 of the housing 14 lies flush with the front surface of the front assembly 12 to thereby protect the lens and other components susceptible of being damaged when the camera is in a collapsed condition.

FIG. 1 makes quite evident the need in a folding camera of the construction shown for a focus adjustment mechanism having the property that no structure extends forwardly from the front surface of the assembly 12. If a focus adjustment mechanism of any of the conventional types (e.g., the rotatable barrel type) were employed in a camera as shown, it is manifest that the user would have to rotate the lens barrel to its rear-most (infinity) position before the camera could be collapsed. The undesirability of such a construction is self-evident.

By this invention manual movement of an external operator forming part of an actuating mechanism effects an axial adjustment in the position of a lens which has a locus of travel wholly confined within the front assembly. The actuating mechanism will be described in detail hereinafter. FIGS. 1–5 disclose a first embodiment of the invention comprising a lens mount 24 securely retaining two fixed elements 26, 28 of a compound objective lens. A movable front element 30 is captured securely by an annular lens carriage 32. The lens carriage 32 has external threads 34 which are preferably of the multiple-start type. The lens carriage 32 is received in an annular carriage support 36 having internal threads 38 mating with the external threads 34 on the lens carriage. As described in detail below, the lens carriage support 36 is rotated by a pinion gear 40 (see FIGS. 1 and 2) which meshes with gear teeth 42 on the outer periphery of the lens carriage support 36.

In order to prevent rotation of the lens carriage 32 with the lens carriage support 36 sliding key means are provided. The sliding key means may take many forms but is shown in the FIGS. 1–5 embodiment as comprising a key 44 which is received in an axial groove 46 formed in the outer surface of the lens carriage 32.

As shown clearly in FIG. 4, the key 44 comprises part of an annular split ring 48 serving as a retainer for the key 44. The ring 48 is received in and frictionally retained by the lens mount 24. Rotation of the lens carriage support 36 while precluding rotation of the lens carriage therewith causes the lens carriage to move axially in the lens carriage support, the direction of axial movement being, of course, dependent upon the direction of the threads 34, 38 and the direction of rotation of the lens carriage support 36. A shroud 50 is secured to the front assembly chassis 52. The shroud 50 offers protection for the front lens element 30 and the lens carriage support 36.

As suggested above, a manually operable actuating mechanism is provided to allow a user to effect axial adjustment of the lens or lens element in accordance with this invention. In the FIGS. 1–5 embodiment the actuating mechanism is illustrated as comprising a manually rotatable operator 54 which is mounted for rotation on the front assembly housing 14. The operator 54 has on its external periphery bevel gear teeth 56. The bevel gear teeth 56 on operator 54 mesh with gear teeth 58 on a bevel gear 60. The gear 60 is illustrated as being carried by a shaft 61 mounted on the housing 14. The angular locus of travel of the bevel gear 60 may be appropriately delimited by conventional stop means (not shown).

A spur gear 66 is rigidly attached to the shaft 61 and thus rotates in unison with the bevel gear 60. The spur gear 66 engages a pinion 68 forming part of an adjustable idler gear 69 supported for rotation by a screw 70 (see FIG. 5). As will be explained in more detail hereinafter, for purposes of calibrating the apparatus the pinion 68 and companion pinion 40 are rotatable relative to each other and can be locked in any desired relative position by tightening a lock screw 72 which frictionally presses the pinion 68 against pinion 40. The pinion 40 meshes with the gear teeth 42 on the periphery of the lens carriage support 36.

Figure 2:
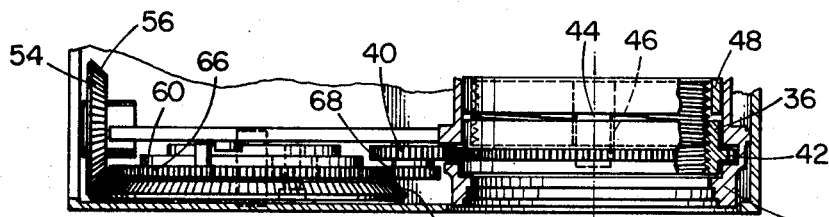
FIG. 2 is a plan view of the assembly shown in FIG. 1 illustrating an adjustable lens carriage in its rearmost (infinity) position.
Figure 2A:
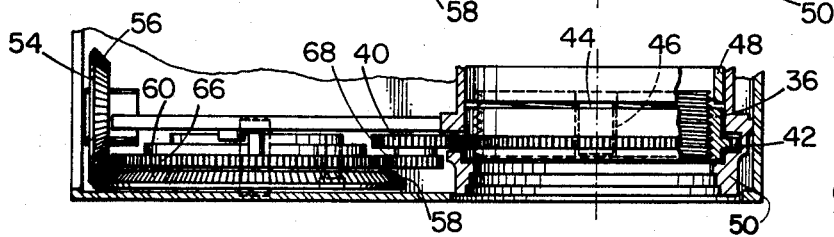
FIG. 2A is a view similar to FIG. 2, but illustrating the lens carriage in its forward-most (near limit) position.

FIG. 2 illustrates the described first embodiment with the lens element 30 set to its rear-most (infinity) position; FIG. 2A shows the apparatus as it might appear with the lens element 30 adjusted to assume its forward-most (near-limit) position.

In operation, to adjust the position of the front element 30, the user manually rotates the operator 54, which acts through a gear train comprising operator 54, bevel gear 60, spur gear 66, and pinions 68, 40 to rotate the lens carriage support 36. As described above, rotation of the lens carriage support 36 causes the lens carriage 32 and thus the lens element 30 to move axially in a direction dependent upon the direction of the threads 34, 38 and the direction of rotation of the operator 54.

In accordance with an aspect of this invention, calibration of the apparatus may be accomplished quickly and easily by first setting the front lens element 30 to its infinity (rear-most) position. The lock screw 72 is then loosened until the pinions 68, 40 rotate freely on the shaft of screw 70. The manual operator 54 is then rotated to a predetermined mark or position associated with an infinity focus setting of the objective. With the objective and the operator thus set in correspondence, they may be effectively locked together by tightening the lock screw 74 which has the effect of joining the pinions 68, 40 so as to rotate as a single unit.

A second method of calibration may be employed with an arrangement as shown in FIGS. 1–5 wherein the key 44 is affixed to or a part of a frictionally held retainer ring. To practice this calibration method, the retainer ring 48 is rotated with respect to the lens mount 24 against its frictional engagement therewith to achieve correspondence between the settings of operator 54 and lens element 30. The idler gear 69 in this arrangement need not be adjustable.

Figure 6:
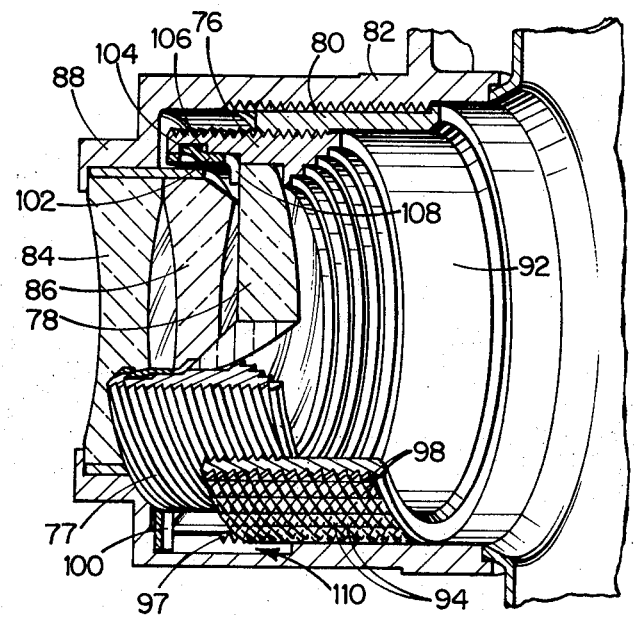
FIG. 6 is a fragmentary perspective view, partly broken away, of a second embodiment of the invention employing a compound lens carriage support.
Figures 7A, 7B:
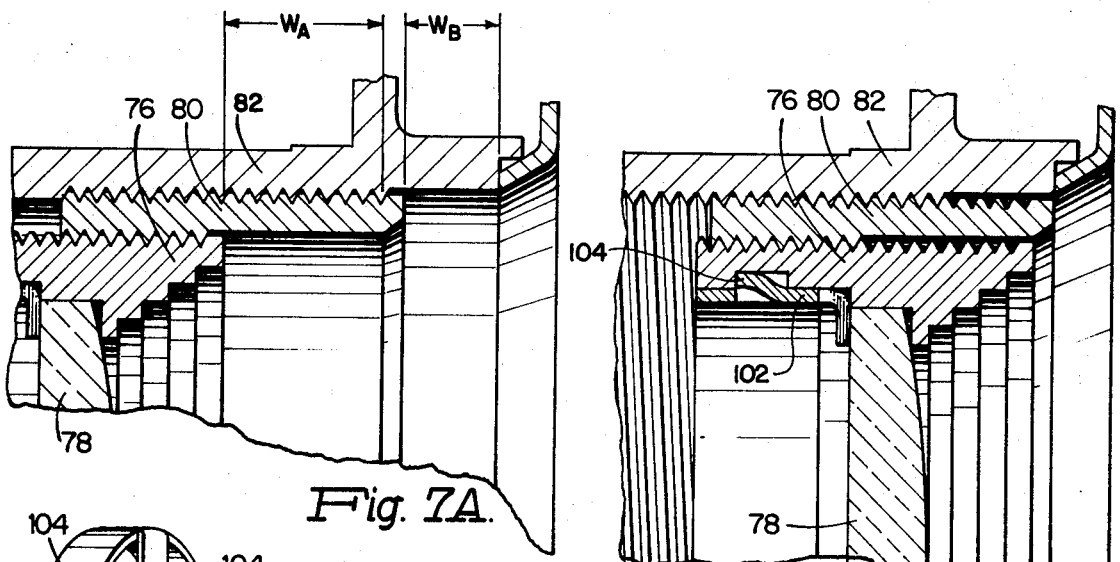
FIGS. 7A and 7B are schematic sectional views of a portion of the FIG. 6 embodiment, showing the manner in which axial displacement of a lens element is achieved by compound movement of a lens carriage support for the element.
Figure 8:
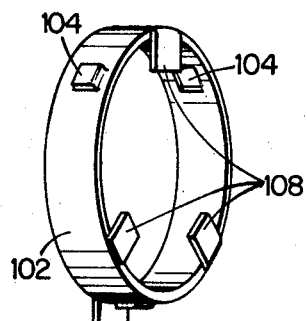
FIG. 8 is a view of a key forming part of the FIG. 6 assembly.

FIGS. 6–8 illustrate a second embodiment of the invention having the property that no threads in the focus adjustment mechanism are exposed to the outside at any time. This embodiment thus minimizes the possibility of the threads being contaminated by foreign matter. To this end, a lens carriage 76 supporting a lens element 78 is received in a lens carriage support 80 which has a bore threaded only a portion of its axial length. The forward portion of the bore is smooth.

The lens carriage support 80 is received in a stationary primary support 82 which, like the lens carriage support 80, has a bore defining threads extending only a portion of the axial length thereof. FIGS. 7A and 7B illustrate the manner in which contamination suppression is achieved without requiring an abbreviation of the locus of travel of the lens element 78. Referring to FIG. 7A, the smooth portion of the bore of the lens carriage support 80 is labeled $W_A$; the smooth portion of the bore of the stationary support 82 is labeled $W_B$. It is readily evident from an inspection of FIGS. 7A and 7B that the total travel of the lens element 78 is equal to $W_A + W_B$, the cumulative travel of the lens carriage support 80 and the lens carriage 76. It is also manifest that by this arrangement no threads are exposed at any time.

FIG. 6 shows a structural implementation of the described second embodiment of the invention. In FIG. 6, an objective lens is illustrated as comprising a rear element 84, a middle element 86, and front element 88. The rear element 84 and middle element 86 are captured and retained by a lens mount 88.

Lens carriage 76 is illustrated as having defined on its outer periphery external threads 77, which preferably are of the multiple-start type. As briefly described above, the lens carriage support 80 has a bore defining threads on but a portion thereof. The forward portion 92 of the bore is smooth and makes a close sealing engagement with the outer periphery of the lens carriage 76.

The lens carriage support 80 has threads 94 defined on its external surface; the direction of these threads 94 is opposite to the direction of the threads on the lens carriage 76 and on the inner periphery of the lens carriage support 80. The threads 94 mesh with internal threads 97 on the inner periphery of the primary support 82. In the FIG. 6 embodiment the primary support 82 is integrally connected to the lens mount 88.

In order that the lens carriage support 80 may be selectively rotated, as by an external actuating mechanism such as is shown in FIGS. 1–2, the lens carriage support 80 has defined on its external periphery gear teeth 98. The gear teeth 98 are superimposed on and coextensive with threads 94. Alternatively, the gear teeth 98 may be separated axially from the threads 94, however, a loss of total carriage travel must necessarily result in such an arrangement.

In order to preclude rotation of the lens carriage 76 as the lens carriage support 80 is rotated, sliding key means are provided. In the FIGS. 6–8 embodiment the sliding key means is shown as comprising a key 100 formed as an integral part of a retainer ring 102. The retainer ring 102 is shown clearly in FIG. 8. The retainer ring 102 has a set of outstruck tabs 104 which are received in recesses 106 in the inner periphery of the lens carriage 76 to thereby preclude rotation of the retainer ring 102 relative to the lens carriage 76.

The retainer ring also has a set of inwardly deflected tabs 108 which bear against a marginal portion of the lens element 78 and thus serve as a retainer for element 78. The primary support 82 has a groove 110 formed therein which functions to slideably receive the key 100.

In operating, rotation of the lens carriage support, for example by a manually operable actuating mechanism as shown in FIGS. 1 and 2, effects a rotation of the lens carriage support 80 to thereby cause a compound cumulative axial movement of the carriage support 80 and lens carriage 76. This compound movement causes the lens element 78 to be displaced along the optical axis thereof according to the sum of the displacements of the lens carriage 76 and lens carriage support 80 ($W_A + W_B$ in FIGS 7A – 7B).

Calibration of the FIGS. 6–8 embodiment may be achieved by the same means and method as described first above with respect to the FIGS. 1–5 embodiment.

FIGS 9–10 illustrate a third structure contemplated for implementing the principles of this invention. This embodiment illustrates a front assembly 112 for a camera including a variable focus objective lens 114. In accordance with this invention a focus adjustment mechanism is provided for effecting selective movement of the lens 114 along the optical axis thereof. The focus adjustment mechanism comprises an annular lens carriage 116 for mounting the lens 114. The lens carriage 116 is received within the bore of a tubular lens carriage support 118. The lens carriage support 118 has internal threads 120 mating with external threads 122 on the periphery of the lens carriage 116.

Means are provided for rotating the support 118 while precluding angular rotation of the carriage 116 to thus effect axial translation of the carriage 116 along the optical axis of the lens 114. To this end, the illustrated embodiment includes a manually operable rotary actuator 124 having on the periphery thereof gear teeth 126 which mate with gear teeth 128 carried on the lens carriage support 118.

The support 118 and the rotary actuator 124 are mounted for rotation by a pair of walls 132, 134 extending across a housing 135 for the assembly 112 transverse to the optical axis of the lens 114. The walls 132, 134 have a pair of circular openings, the margins of which support annular bearings 140, 142. A pair of sleeves 144, 146 found in the walls 132, 134, respectively, define bearings for receiving axles 148, 150 on the rotary actuator 124.

In order to prevent the lens carriage 116 from following rotation of the barrel 118 while allowing axial movement thereof, the lens carriage 116 mounts a key 152 in the form of a rod which is received in a sliding relationship in the bore of a tubular keyway 154.

In order to enable the lens setting to be calibrated during manufacture of the camera, the keyway 154 is illustrated as being angularly adjustable. Numerous structures may be devised for effecting such angular adjustability of the keyway 154; the disclosed arrangement shows the keyway 154 as comprising part of a spring clip 156 which may be selectively positioned along an arcuate support mechanism 158.

It is manifest from an inspection of FIGS. 1–2 and the above description that rotation of the actuator 124 by the camera operator will cause the lens carriage support 118 to rotate and, because of the angular stationarity produced by the key 152 and keyway 154, the lens carriage 116 and thus the lens 114 is displaced axially to adjust the focus of the lens 114.

In order to preclude entry of dust and other foreign matter into the adjustment mechanism and exposure chamber, in accordance with this invention a seal in the form of a bellows 160 is connected between the lens carriage 116 and the housing 135. The bellows 160 may be connected to the housing 135 and carriage 116 by any conventional means. The bellows 160 may be fabricated from rubber, plastic, or other suitable bellows construction materials. It should be noted that the extensibility requirements on the bellows are quite lax since it need only extend a distance equal to the extent of travel of the lens carriage 116, for example, normally a minor fraction of an inch.

The invention is not limited to the particular details of construction of the embodiments depicted, and it is contemplated that various and other modifications and applications will occur to those skilled in the art.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. In a photographic camera of the type having a variable focus objective lens means with an optical axis and at least one movable lens element, a position adjustment mechanism for varying the axial position of said lens element to adjust the focus of said lens means having lens carriage means mounting said lens element, said carriage means having external threads, carriage support means for supporting said lens carriage means for movement along said axis, said support means having internal threads mating with said threads on said carriage means, and manually operable actuating means for effecting selective rotation of said carriage support means; the improvement comprising:

a key member, comprising a cylindrical rod, affixed to and extending from said carriage means parallel to said optical axis;

keyway mounting means, with an arcuate element centered on said axis;

keyway means, having a hollow tube; and means for adjustably securing said hollow tube at a selected angular position on said arcuate element, said hollow tube receiving said cylindrical rod in axial sliding engagement while precluding angular movement of said cylindrical rod, thereby preventing rotation of said carriage means with said carriage support means while providing freedom of axial movement of said carriage means.

2. In a photographic camera of the type having housing means, a variable focus objective lens means with an optical axis and at least one movable lens element, and a position adjustment mechanism for varying the axial position of said lens element to adjust the focus of said lens means, with lens carriage means mounting said lens element, said carriage means having external threads, carriage support means rotatably mounted on said housing means for supporting said lens carriage means for movement along said axis, said support means having internal threads mating with said threads on said carriage means and external gear means, an actuator gear rotatably mounted on said housing and having a portion extending from said housing for tactile engagement by an operator, and an idler gear supported by said housing so as to couple said actuator gear and said carriage support means for transmitting rotation of said actuator gear to said carriage support means; the improvement comprising:

a key member, being a cylindrical rod, affixed to and extending from said carriage means parallel to said optical axis;

keyway mounting means, with an arcuate element centered on said axis;

keyway means, having a hollow tube; and means for adjustably securing said hollow tube at a selected angular position on said arcuate element, said hollow tube receiving said cylindrical rod in axial sliding engagement while precluding angular movement of said cylindrical rod, thus preventing rotation of said carriage means with said carriage support means while providing freedom of axial movement of said carriage means.

3. In a photographic camera of the type having housing means, a variable focus objective lens means with an optical axis and at least one movable lens element, lens carriage means mounting said lens element, said carriage means having external threads, carriage support means rotatably mounted on said housing means for supporting said lens carriage means for movement along said axis, said support means having internal threads mating with said threads on said carriage means and external gear means, and sliding key means for preventing rotation of said carriage means with said carriage support means while providing freedom of axial movement of said carriage means; the improvement comprising:

an actuator gear rotatably mounted on said housing having a portion extending from said housing for tactile engagement by an operator;

an idler supported by said housing so as to couple said actuator gear and said carriage support means for transmitting rotation of said actuator gear to said carriage support means;

first and second pinions coaxially mounted on said idler gear for relative rotation; and means for locking said first and second pinions together at a selected relative angular position.

* * * * *